(12) United States Patent
Kim et al.

(10) Patent No.: US 12,416,515 B2
(45) Date of Patent: Sep. 16, 2025

(54) FIXING APPARATUS FOR INSTALLING PRESSURE-TYPE AIRBAG SENSOR

(71) Applicant: KOREA ELECTRIC TERMINAL CO., LTD., Incheon (KR)

(72) Inventors: Hong-Chul Kim, Incheon (KR); Chul-Jin Jang, Incheon (KR)

(73) Assignee: KOREA ELECTRIC TERMINAL CO., LTD., Incheon (KR)

( * ) Notice: Subject to any disclaimer, the term of this patent is extended or adjusted under 35 U.S.C. 154(b) by 376 days.

(21) Appl. No.: 18/012,700

(22) PCT Filed: Jun. 22, 2021

(86) PCT No.: PCT/KR2021/007828
§ 371 (c)(1),
(2) Date: Dec. 23, 2022

(87) PCT Pub. No.: WO2021/261888
PCT Pub. Date: Dec. 30, 2021

(65) Prior Publication Data
US 2023/0266192 A1     Aug. 24, 2023

(30) Foreign Application Priority Data
Jun. 25, 2020    (KR) ........................ 10-2020-0077749

(51) Int. Cl.
*G01D 11/30*    (2006.01)
*F16B 21/02*    (2006.01)
(Continued)

(52) U.S. Cl.
CPC .............. *G01D 11/30* (2013.01); *F16B 21/02* (2013.01); *G01L 17/00* (2013.01);
(Continued)

(58) Field of Classification Search
CPC ... G01L 17/00; G01L 19/0038; G01L 19/147; G01D 11/30; F16B 5/126; F16B 21/02;
(Continued)

(56) References Cited

U.S. PATENT DOCUMENTS

| | | |
|---|---|---|
| 9,003,891 B2 | 4/2015 | Frank |
| 2013/0055822 A1 | 3/2013 | Frank |
| 2018/0246001 A1 | 8/2018 | Kim et al. |

FOREIGN PATENT DOCUMENTS

| | | |
|---|---|---|
| KR | H8-40185 A | 2/1996 |
| KR | 10-2006-0109480 A | 10/2006 |

(Continued)

OTHER PUBLICATIONS

The Extended European Search Report issued on Nov. 27, 2023 for corresponding European Application No. 21828594.8 (7 pages).
(Continued)

*Primary Examiner* — Benjamin R Schmitt
(74) *Attorney, Agent, or Firm* — Hauptman Ham, LLP

(57) ABSTRACT

The present invention provides a fixing device for installing a pressure-type airbag sensor. The fixing device for installing a pressure-type airbag sensor includes a holder having a disk shape, a cover coupled to the holder and having a sensor unit disposed at an upper end thereof, and a connector housing disposed at a lower end of the cover. The cover may include a cover body having a disc shape. Reverse rotation prevention protrusions protruding outward may be formed at intervals at a plurality of positions on an outer circumference of the cover body. Rotation guide protrusions may protrude from the plurality of positions of the cover body, and corners thereof may be formed in a predetermined curvature. The rotation guide protrusions may be formed to correspond to the number of rotation locking parts formed on an outer wall of the holder.

5 Claims, 18 Drawing Sheets

(51) Int. Cl.
  *G01L 17/00* (2006.01)
  *G01L 19/00* (2006.01)
  *G01L 19/14* (2006.01)
  *B60R 21/01* (2006.01)
(52) U.S. Cl.
  CPC ........ *G01L 19/0038* (2013.01); *G01L 19/147* (2013.01); *B60R 21/01* (2013.01); *B60R 2021/01211* (2013.01)
(58) Field of Classification Search
  CPC ........... B60R 21/01; B60R 2021/01211; B60R 19/483; B60R 21/20; B60R 2021/0006; B60Y 2400/30
  See application file for complete search history.

(56) References Cited

FOREIGN PATENT DOCUMENTS

| | | |
|---|---|---|
| KR | 10-2013-0079418 A | 7/2013 |
| KR | 10-2013-0105786 A | 9/2013 |
| KR | 10-2016-0019811 A | 2/2016 |
| KR | 10-2016-0019812 A | 2/2016 |
| KR | 10-1621476 B1 | 5/2016 |
| KR | 10-2017-0042109 A | 4/2017 |
| KR | 20170042109 A * | 4/2017 ............. G01D 11/30 |
| KR | 10-2017-0060921 A | 6/2017 |
| KR | 10-1804581 B1 | 12/2017 |
| KR | 10-2191492 B1 | 12/2020 |

OTHER PUBLICATIONS

International Search Report mailed on Oct. 19, 2021, in connection with International Patent Application No. PCT/KR2021/007828, along with an English translation, 6 pages.
Written Opinion mailed on Oct. 19, 2021, in connection with International Patent Application No. PCT/KR2021/007828, 3 pages.

* cited by examiner (a)

(b)

(a)

(b)

(a1=a2)

FIXING APPARATUS FOR INSTALLING PRESSURE-TYPE AIRBAG SENSOR

CROSS-REFERENCE TO RELATED APPLICATIONS

The present application is a national stage filing under 35 U.S.C. § 371 of PCT application number PCT/KR2021/007828 filed on Jun. 22, 2021, which is based upon and claims the benefit of priority to Korean Patent Application No. 10-2020-0077749 filed on Jun. 25, 2020, in the Korean Intellectual Property Office, which are incorporated herein by reference in their entireties.

TECHNICAL FIELD

The present invention relates to a fixing device for installing a pressure-type airbag sensor.

DESCRIPTION OF RELATED ART

Side airbags are installed in vehicles to protect drivers.

In the event of a side impact of the vehicle, an output signal from a side impact sensor installed on a side surface of the vehicle is input to an airbag control unit (ACU), and unfolding of the side airbag is controlled by the ACU.

In recent years, a pressure side impact sensor (PSIS) is mounted on a side portion of the vehicle to detect whether a side impact occurs.

The PSIS is mainly installed in a driver's door or a passenger's door. The PSIS serves to detect a pressure change generated inside a door momentarily due to deformation of the door in the event of the side impact and transmit the detected pressure change to the ACU.

Since an AK-LV 29 standard PSIS is mounted while rotating using one hand, convenience of installation is enhanced through a structure of two handles. This handle structure allows more moment to be transmitted during the rotation. Further, since the PSIS should not be loosened due to durability conditions or vibrations of the vehicle after the PSIS is completely installed, a loosening prevention part is provided.

In the PSIS according to the related art, a structure for assembling a plurality of components is complicated. For example, since structures such as a rotational direction fixing part that restricts movement in a rotational direction and the loosening prevention part that prevents separation between the components are additionally required, the structure is complicated.

The related document related to the present invention is JP-08040185.

RELATED ART DOCUMENT

Patent Document (Patent Document 001) JP 08040185

SUMMARY OF THE DISCLOSURE

The present invention is directed to providing a fixing device for installing a pressure-type airbag sensor, in which a holder and a cover are prevented from being separated from each other, when the cover (400) passes through a section of the protrusion parts (140) and rotates to a set fastening position, one surface of the cover (400) is separated from the protrusion parts (140) and returns to its original position, and in this case, the seal (130) is in elastic contact with the cover (400), and thus smooth sealing can be achieved at a position at which the rotation is completed.

Further, the present invention is directed to also providing a fixing device for installing a pressure-type airbag sensor, in which a connector housing (300) is covered through a prevention plate (152) before fastening between the holder (100) and the cover (400) is completed, and thus fastening of the connector housing (300) can be prevented from the outside.

The purposes of the present invention may be not limited to the purposes described above, and other purposes and advantages of the present invention that are not described may be understood by the following description and may be more clearly understood by embodiments of the present invention. Further, it may be easily identified that the purposes and advantages of the present invention may be implemented by units and combinations thereof described in the appended claims.

One aspect of the present invention provides a fixing device for installing a pressure-type airbag sensor.

The fixing device for installing a pressure-type airbag sensor includes a holder (100) having a disk shape, a cover (400) coupled to the holder (100) and having a sensor unit disposed at an upper end thereof, and a connector housing (300) disposed at a lower end of the cover (400).

The holder (100) may have a holder body (110) formed in a disc shape.

An outer wall (120) having a predetermined height may be formed on an outer circumference of the holder body (110).

A seal having a ring shape may be insert-injected into the holder body (110) to have a predetermined radius Protrusion parts (140) having a predetermined curvature are formed on an upper surface and a lower surface of the holder body (110).

The protrusion parts (140) may be formed to protrude in a pair from each of the upper surface and the lower surface of the holder body (110).

The pair of protrusion parts (140) may be positioned to be symmetrical to each other with a central hole (111) formed at a center of the holder body (110) as a boundary on each of the upper surface and the lower surface of the holder body (140).

The pair of protrusion parts (140) formed on each of the upper surface and the lower surface of the holder body (110) may be arranged at the same position.

Locking parts (180) protruding upward may be formed to protrude from a plurality of positions on the outer circumference of the holder body (110).

The plurality of locking parts (180) may be formed.

The locking parts (180) may be formed in a shape bent in an L shape toward an inside of the holder body (110).

Each of the locking parts (180) may have a neck (181) extending from an outer wall thereof and a hook (182) bent inward from an upper end of the neck (181).

The plurality of locking parts (180) may be arranged at intervals of 60 degrees.

Rotation locking parts (190) may be formed at a plurality of positions on the outer circumference of the holder body (110).

Each of the rotation locking parts (190) may be formed in a rectangular plate shape.

Each of the rotation locking parts (190) may be formed by being cut in a rectangular shape from the outer circumference of the holder body (110).

A length of each of the rotation locking parts (190) may be formed longer than a thickness of the holder body (110).

The rotation locking parts (190) may be positioned on side portions of the locking parts (180), respectively.

A thickness of each of the rotation locking parts (190) may gradually become thicker from one side to the other side.

DETAILED DESCRIPTION OF EXEMPLARY IMPLEMENTATIONS

Hereinafter, provision or arrangement of an arbitrary component on an "upper portion (or a lower portion)" of a substrate or "on (or under)" the substrate means that the arbitrary component is provided or arranged in contact with an upper surface (or a lower surface) of the substrate.

Further, the present invention is not limited to a state in which another component is not included between the substrate and the arbitrary component provided or arranged on (or under) the substrate.

Hereinafter, a fixing device for installing a pressure-type airbag sensor according to the present invention will be described with reference to the accompanying drawings.

The fixing device for installing a pressure-type airbag sensor according to the present invention includes a holder and a cover.

The holder according to the present invention will be described.

Figure 1:
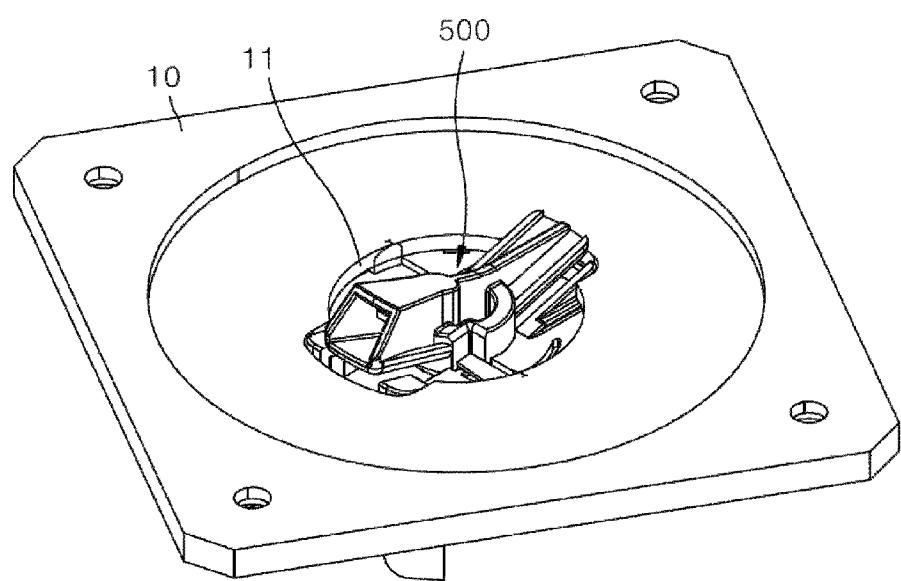
FIG. 1 is a perspective view illustrating a state in which a fixing device for installing an airbag sensor according to the present invention is disposed on a panel.
Figure 2:
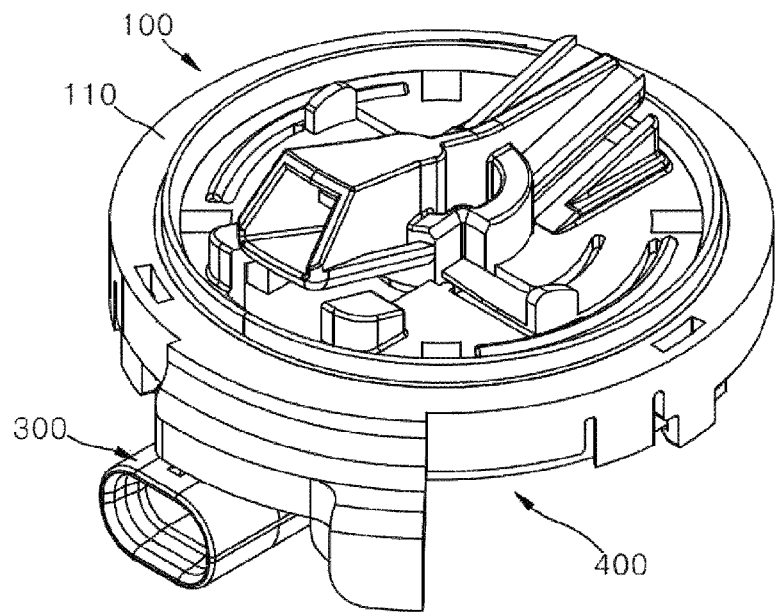
FIG. 2 is perspective views illustrating the fixing device for installing an airbag sensor according to the present invention.
Figure 2:
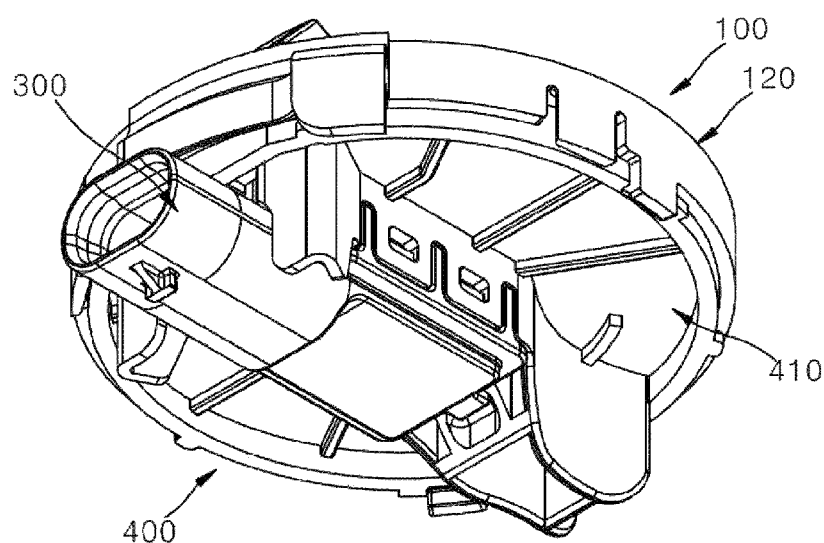

FIG. 1 is a perspective view illustrating a state in which a fixing device for installing a pressure-type airbag sensor according to the present invention is disposed on a panel, and FIG. 2 are perspective views illustrating the fixing device for installing a pressure-type airbag sensor according to the present invention.

The fixing device for installing a pressure-type airbag sensor according to the present invention is fixed to a panel 10.

The fixing device for installing a pressure-type airbag sensor has a holder 100 and a cover 400. A sensor unit 500 is disposed at an upper end of the cover 400, and a connector housing 300 is disposed at a lower end of the cover 400.

Figure 3:
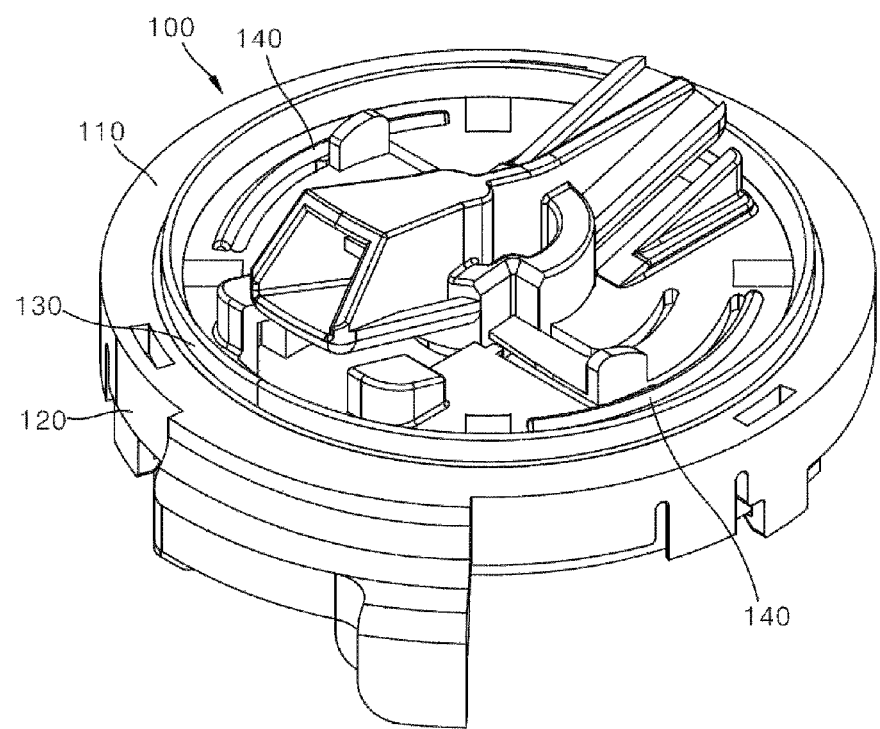
FIG. 3 is a perspective view illustrating a state in which a cover and a holder according to the present invention are coupled.
Figure 4:
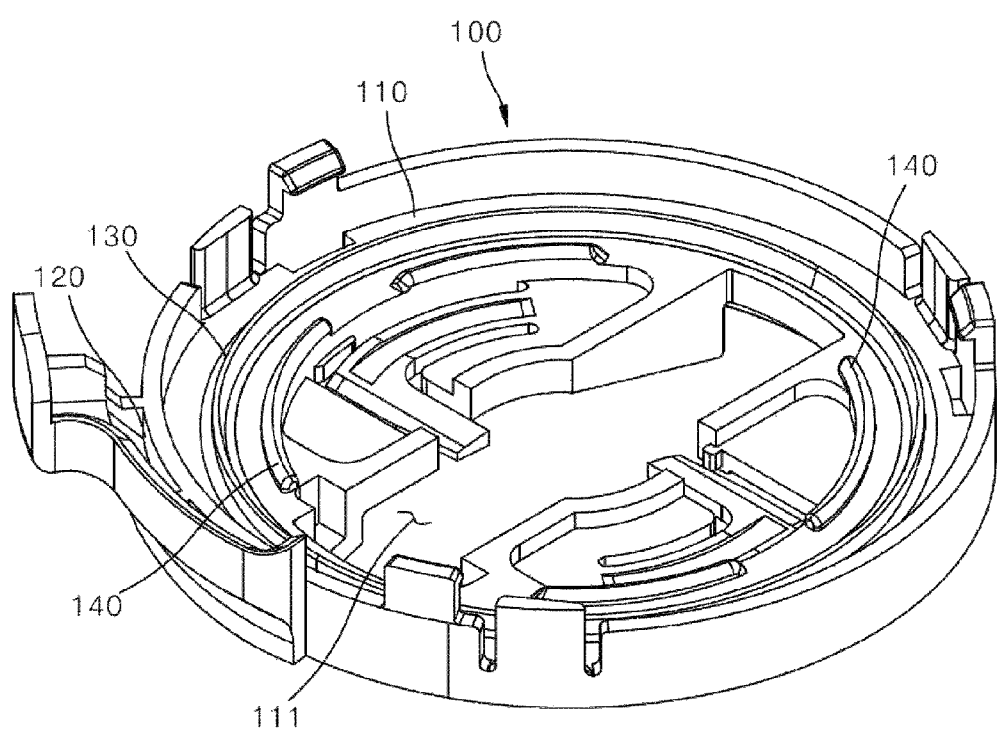
FIG. 4 is a perspective view illustrating a configuration of the holder according to the present invention.

FIG. 3 is a perspective view illustrating a state in which a cover and a holder according to the present invention are coupled, and FIG. 4 is a perspective view illustrating a configuration of the holder according to the present invention.

Referring to FIGS. 3 and 4, the holder 100 according to the present invention has a holder body 110 formed in a disc shape. An outer wall 120 having a predetermined height is formed on an outer circumference of the holder body 110.

A seal 130 having a ring shape is insert-injected into the holder body 110 to have a predetermined radius. The seal 130 protrudes from an upper surface and a lower surface of the holder body 110 at a predetermined level.

A central hole 111 having an entirely rectangular shape is cut and formed in a center of the holder body 110.

Further, protrusion parts 140 having a predetermined curvature are formed on the upper surface and the lower surface of the holder body 110 according to the present invention.

Each of the protrusion parts 140 forms a predetermined curvature.

The protrusion parts 140 are formed to protrude from each of the upper surface and the lower surface of the holder body 110 in a pair.

The pair of protrusion parts 140 are formed symmetric to each other with respect to the central hole 111 as boundary on each of the upper surface and the lower surface of the holder body 140.

The pair of protrusion parts 140 formed on the upper surface and the lower surface of the holder body 110 are arranged at the same position.

A height of the protrusion parts 140 may be lower than a height of the seal 130.

Further, an outer circumferential length of the protrusion parts 140 may be a quarter of the entire circumferential length connecting the protrusion parts 140.

The holder body 110 according to the present invention is configured to rotate, and the seals 130 arranged on both surfaces of the holder body 110 form sealing due to contact with the cover 400 that is a counterpart.

In this case, while the cover 400 rotates, the cover 400 comes into physical contact with a section in which the protrusion parts 140 are formed and thus rotates while lifted by the height of the protrusion parts 140. Accordingly, when the cover 400 rotates, while the seal 130 is protected from the cover 400 that is a counterpart, the holder body 110 may rotate.

Further, when the cover 400 passes through a section of the protrusion parts 140 and is rotated to a set fastening position, one surface of the cover 400 is separated from the protrusion parts 140 and returns to its original position. In this case, the seal 130 may be in elastic contact with the cover 400 to achieve smooth sealing at a position at which rotation is completed.

An upper end of the protrusion part 140 may be formed in a rounded shape.

Figure 5A:
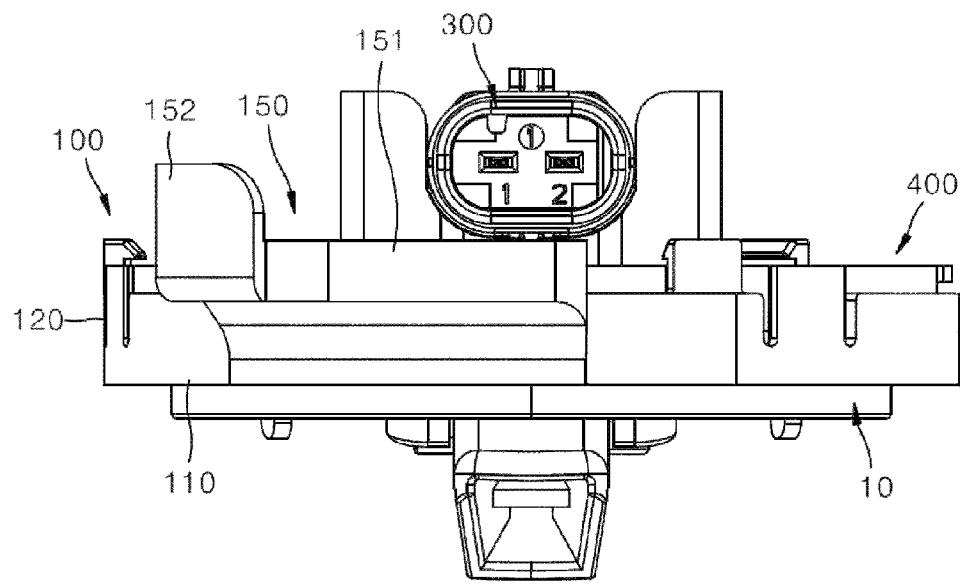
FIG. 5A is a front view illustrating the holder according to the present invention.
Figure 5B:
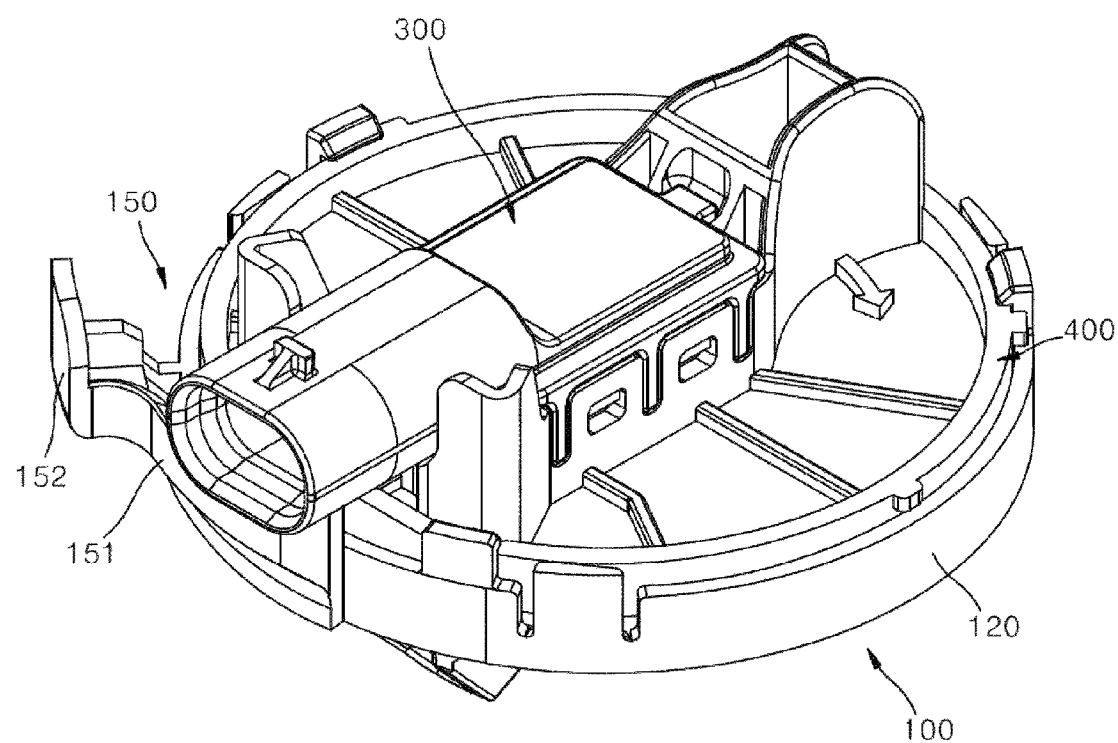
FIG. 5B is a perspective view illustrating a bottom surface of the holder according to the present invention.

FIG. 5A is a front view illustrating the holder according to the present invention, and FIG. 5B is a perspective view illustrating a bottom surface of the holder according to the present invention.

Referring to FIGS. 5A and 5B, a connector insertion prevention part 150 is formed on the outer circumference of the holder body 110 according to the present invention.

The connector insertion prevention part 150 has a rib 151 having a predetermined length and a prevention plate 152 protruding outward from an end of the rib 151.

The rib 151 and the prevention plate 152 are formed integrally. A position of the prevention plate 152 changes while the holder body 110 rotates.

The prevention plate 152 may be formed in the holder body 110 to be positioned at a position covering the front side of the connector housing 300 in a position of the cover 400 before the rotation.

Further, when the holder body 110 is rotated to a position at which the holder body 110 is completely fastened to the cover 400, the prevention plate 152 is positioned on a lateral side of the connector housing 300. Accordingly, when the holder 100 and the cover 400 are completely fastened, the connector housing 300 disposed on the upper surface of the cover 400 forms an open state.

That is, the connector housing 300 is covered through the prevention plate 152 before fastening between the holder 100 and the cover 400 is completed, and thus fastening of the connector housing 300 can be prevented from the outside.

Further, the prevention plate 152 is formed to have a rounded curvature from one end to the other end. Therefore, as a slip is induced in the event of an impact with another external structure, damage of the holder 100 can be prevented.

Figure 6:
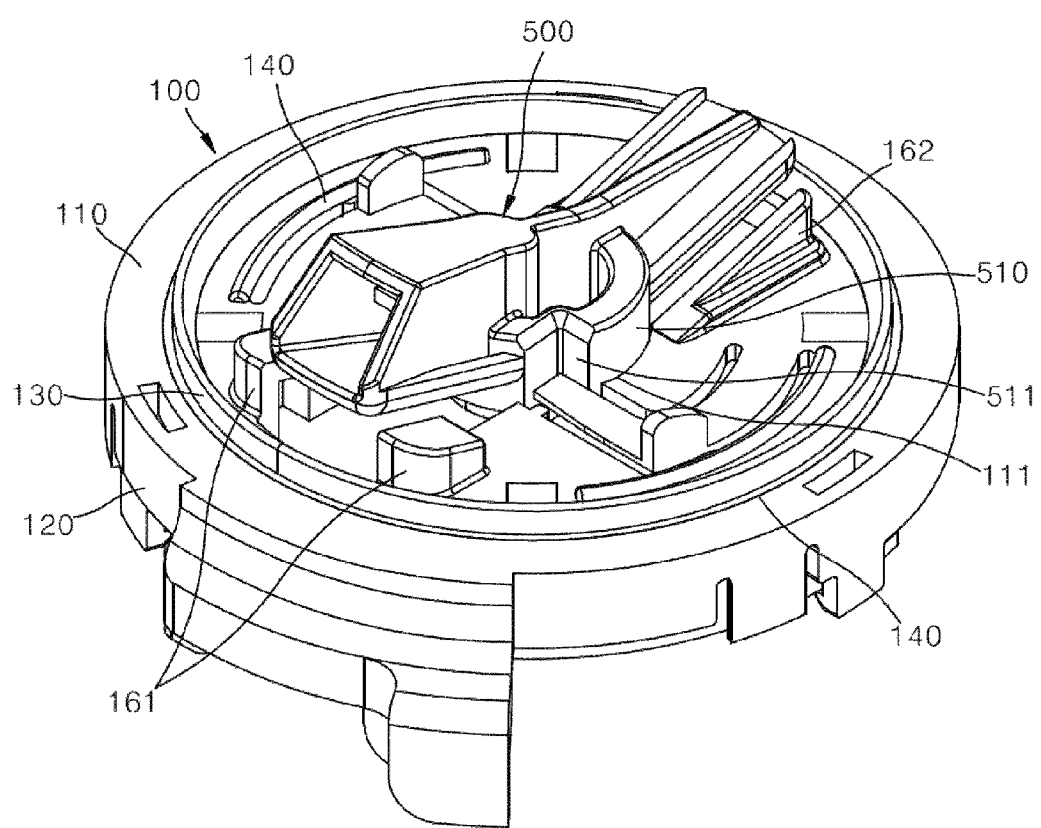
FIG. 6 is a perspective view illustrating a state in which the cover and the holder according to the present invention are fastened.
Figure 7:
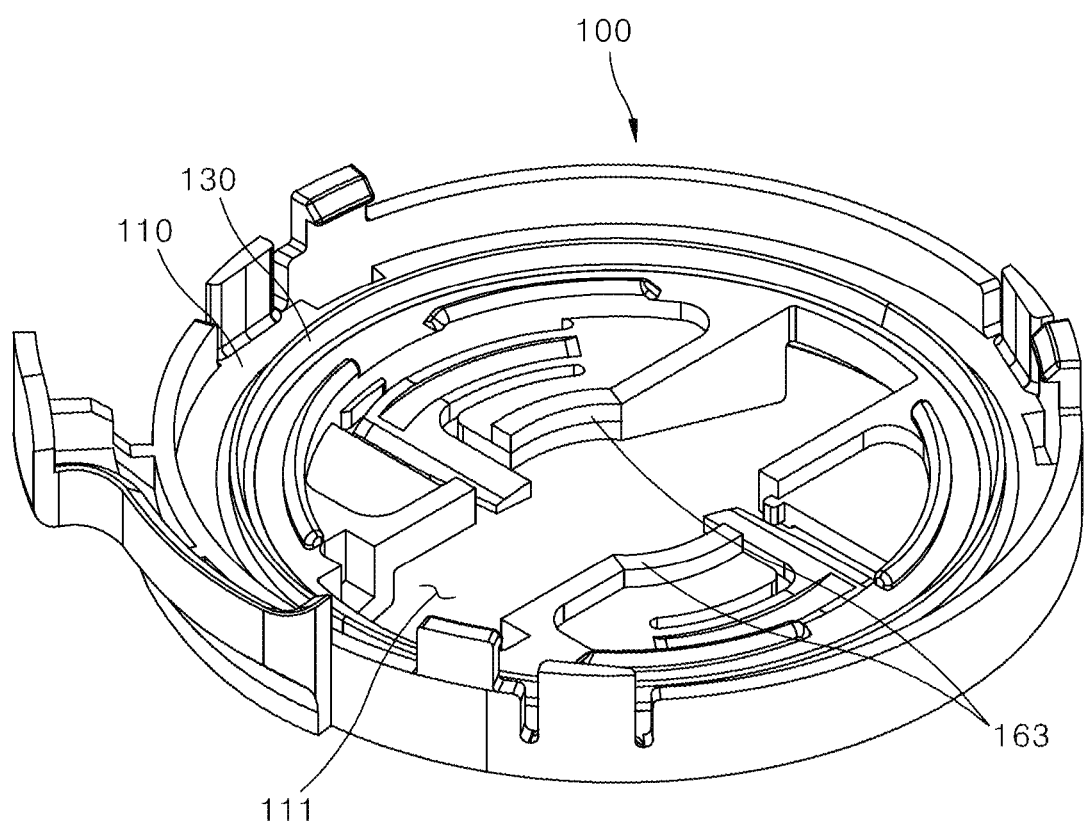
FIG. 7 is a perspective view illustrating a bottom surface of the holder according to the present invention.

FIG. 6 is a perspective view illustrating a state in which the cover and the holder according to the present invention are fastened, and FIG. 7 is a perspective view illustrating a bottom surface of the holder according to the present invention.

Referring to FIGS. 6 and 7, first and second assembly guides 161 and 162 are formed at an upper end of the holder body 110 according to the present invention.

The assembly guides 161 and 162 have a pair of first assembly guides 161 protruding from the upper surface of the holder body 110 at both sides of one end of the central hole.

The pair of first assembly guides 161 form a predetermined distance therebetween. The pair of first assembly guides 161 may be caught by both sides of an inner circumference of one end of a fastening hole 11 formed in the panel 10.

The assembly guides 161 and 162 have a pair of second assembly guides 162 protruding from the upper surface of the holder body 110 at both sides of the other end of the central hole 111.

The pair of second assembly guides 162 are formed as plates having a cross section having a right triangle shape.

The pair of second assembly guides 162 form a predetermined distance therebetween. The pair of assembly guides 162 are supported by both sides of an inner circumference of the other end of the fastening hole 11 formed in the panel 10.

In addition, rotation guides 163 having a predetermined curvature are formed on both sides of a central portion of the center hole 111 of the holder body 110 according to the present invention.

The rotation guides 163 may be configured as a pair of rotation guides 163 while forming a semicircular shape. The pair of rotation guides 163 are arranged to face each other.

The pair of rotation guides 163 are formed thicker than a thickness of the nearby holder body 110 and form a predetermined reinforcement force.

The pair of rotation guides 163 guide rotation of the sensor unit 500 formed on the upper surface of the cover 400. A rotation guide member 510 having a circular shape is formed at a central portion of the sensor unit 500.

Since rotation of the rotation guide member 510 is guided along an inner circumference of the pair of rotation guides 163 and the rotation guide member 510 has a step having a predetermined thickness, the rotation of the rotation guide member 510 of the sensor unit 500 during the rotation can be guided stably.

Although not illustrated in the drawings, a ring-shaped protrusion line is formed on the inner circumference of the pair of rotation guides 163, the protrusion line rotates while fitted in a protrusion line groove formed in an inner circumference of the rotation guide member 510, and thus more stable rotation can also be guided.

Figure 8:
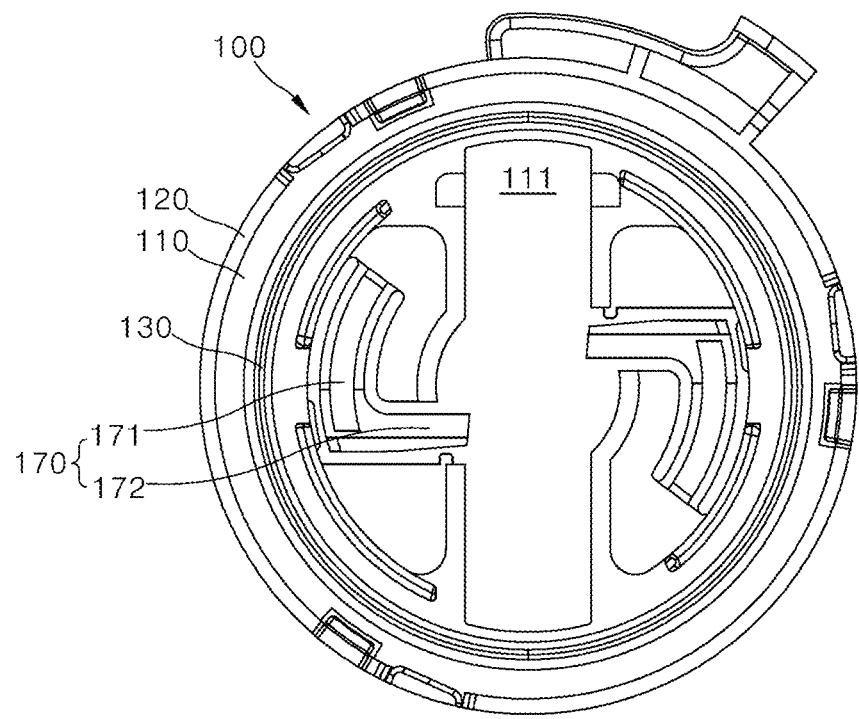
FIG. 8 are views illustrating a holder body in which a spring part is formed according to the present invention.
Figure 8:
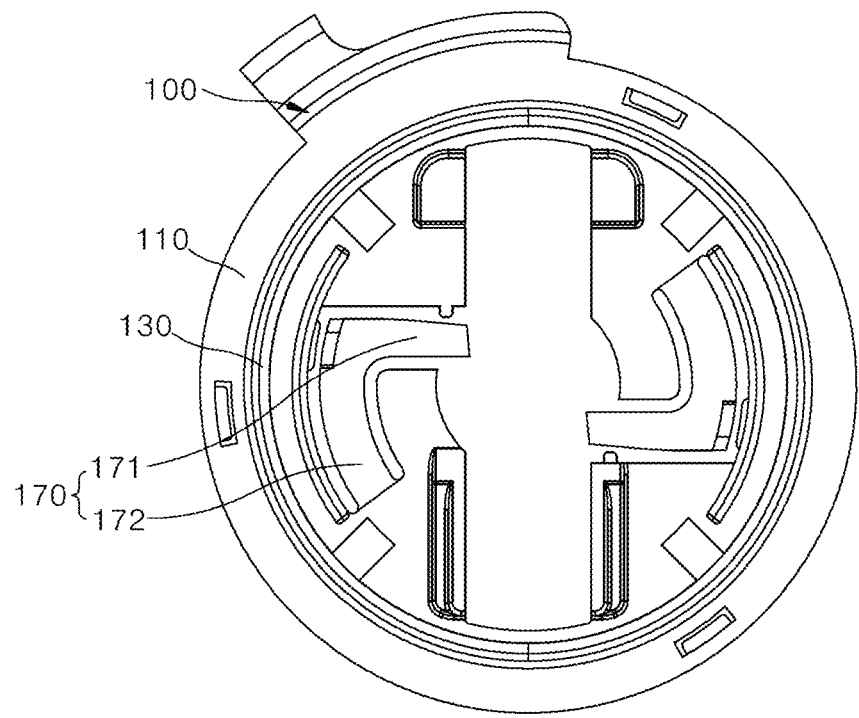
Figure 9:
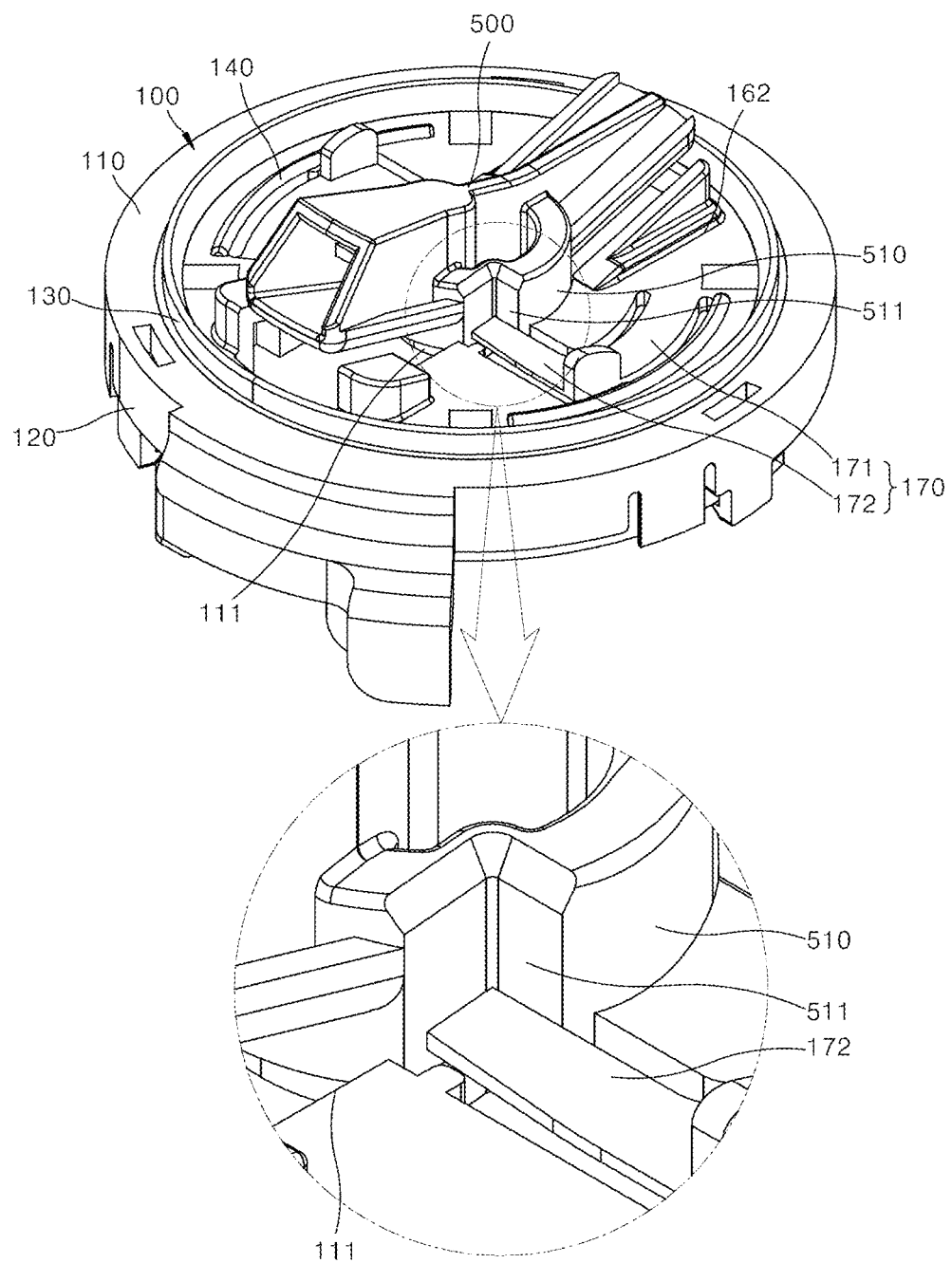
FIG. 9 is a perspective view illustrating a coupling relationship between the spring part and a sensor unit according to the present invention.

FIG. 8 are views illustrating a holder body in which a spring part is formed according to the present invention, and FIG. 9 is a perspective view illustrating a coupling relationship between the spring part and a sensor unit according to the present invention.

Referring to FIGS. 8 and 9, a catching step 511 is formed on an outer circumference of the rotation guide member 510 of the sensor unit 500 according to the present invention.

Further, L-shaped cutout grooves 112 are formed on both sides of a central portion of the central hole 111 formed in the holder body 110.

The spring parts 170 according to the present invention are formed in the cutout grooves 112. Each of the spring parts 170 has a curvature rib 171 having a curvature and a catching rib 172 extending from a distal end of the curvature rib 171 in a straight line.

The end of the curvature rib 171 is formed integrally with an inner surface of the cutout groove 112.

Accordingly, each of the spring parts 700 is formed in a free end shape.

In a state in which the cover 400 is coupled to the central hole 111, a distal end of the catching rib 172 of the spring part 170 is exposed to the central hole 111 and thus may be caught by the catching step 511 of the rotation guide member 510 of the sensor unit 500.

Here, the catching step 511 is formed in an L shape, and an end of the catching rib 172 is formed in a quadrangular shape.

Further, the catching rib 172 is caught by the upper surface of the cover 400. Accordingly, it is possible to prevent the cover 400 from being separated upward.

Further, each of the spring parts 710 includes the curvature rib 171 and the catching rib 172 to form a predetermined length and thus has elasticity corresponding to the distance. Therefore, fastening sense between the holder 100 and the cover 400 can be improved, and assembly thereof can be secured.

In addition, the catching step 511 is formed in an L shape, and the end of the catching rib 172 caught thereby is formed in a quadrangular shape. Thus, the catching step 511 prevents the rotation before the cover 400 rotates and is completely fastened to the holder 100 and restricts reverse rotation of the cover 100 after the assembly.

Figure 10:
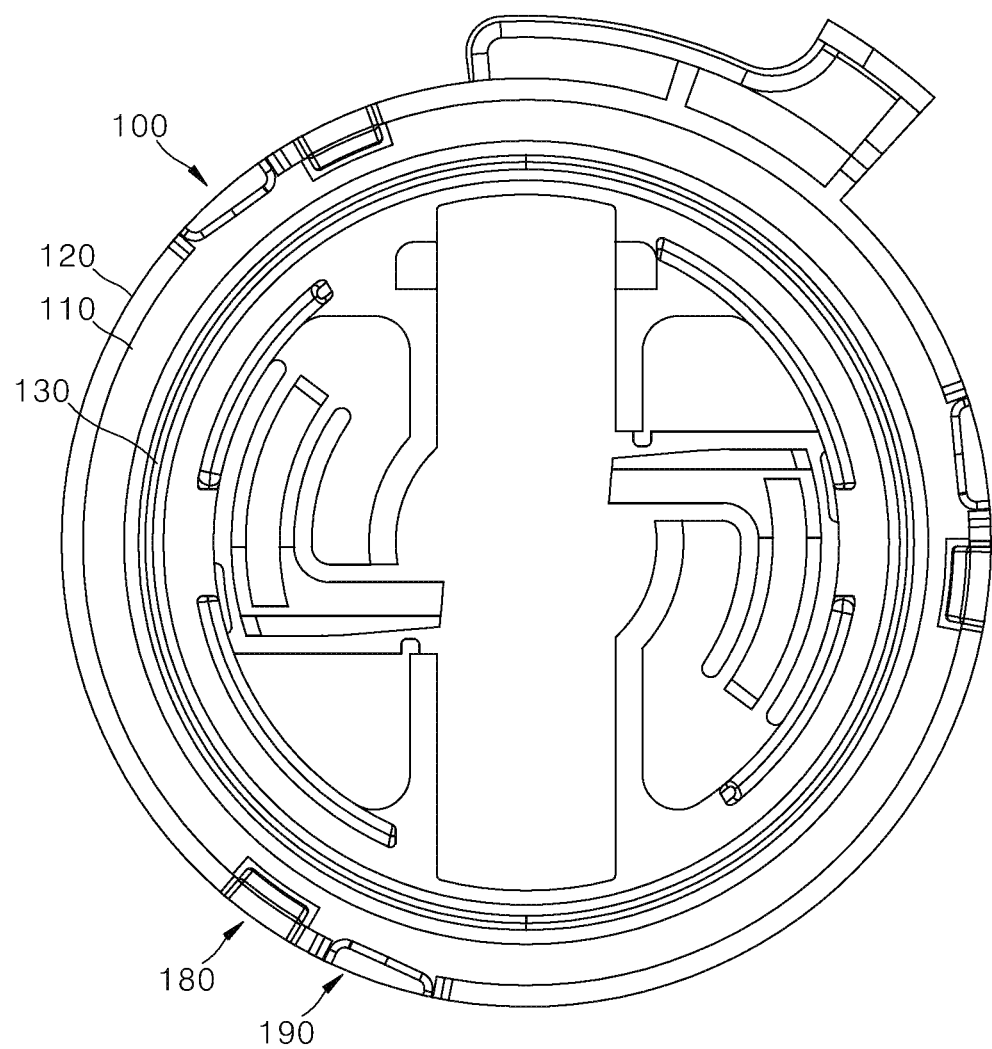
FIG. 10 is a plan view illustrating the holder in which a locking part is formed according to the present invention.
Figure 11A:
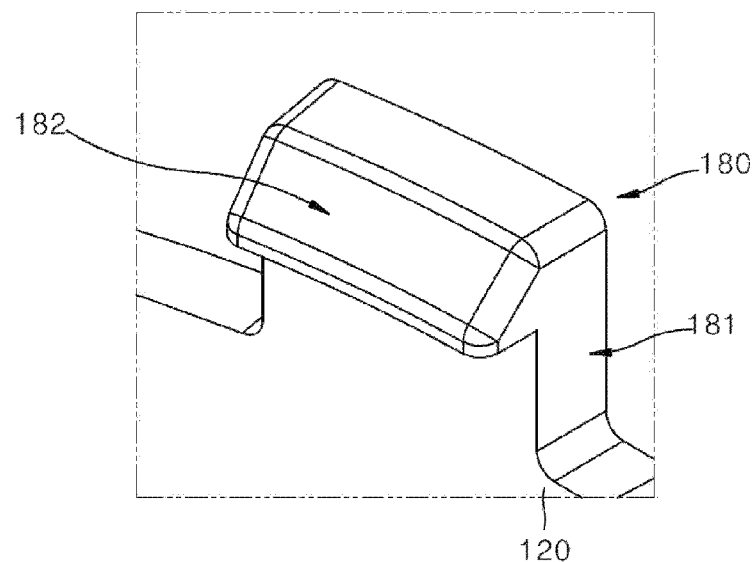
FIG. 11A is an enlarged perspective view illustrating the locking part according to the present invention.

FIG. 10 is a plan view illustrating the holder in which a locking part is formed according to the present invention, and FIG. 11A is an enlarged perspective view illustrating the locking part according to the present invention.

Referring to FIGS. 10 and 11A, locking parts 180 protruding upward are formed to protrude from a plurality of positions on the outer circumference of the holder body 110 according to the present invention.

The plurality of locking parts 180 are formed. The locking part 180 is formed in a shape bent in an L shape toward an inner side of the holder body 110.

The locking part 180 has a neck 181 extending from an outer wall thereof and a hook 182 bent inward from an upper end of the neck 181.

Further, the plurality of locking parts 180 may be arranged at intervals of 60 degrees.

Therefore, when the cover 400 is rotated to a fastening position while coupled to the holder 100, ends of the locking parts 170 are caught by and fixed to an outer circumference of the lower end of the cover 400. Therefore, it is possible to prevent the cover 400 from being separated from a lower portion of the holder 100.

Further, although not illustrated in the drawings, insertion grooves into which the ends of the locking parts 180 are inserted may be further formed at a plurality of positions on the outer circumference of the lower end of the cover 400.

Figure 11B:
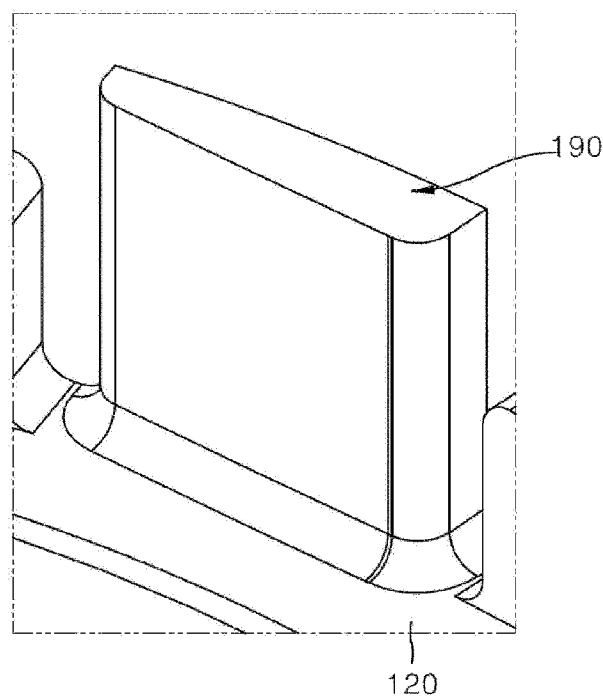
FIG. 11B is an enlarged perspective view illustrating a rotation locking part according to the present invention.

FIG. 11B is an enlarged perspective view illustrating a rotation locking part according to the present invention.

Referring to FIG. 11B, rotation locking parts 190 are formed at the plurality of positions on the outer circumference of the holder body 110 according to the present invention.

Each of the rotation locking parts 190 is formed in a rectangular plate shape and is formed by being cut in a rectangular shape from the outer circumference of the holder body 110.

Further, a length of each of the rotation locking parts 190 is formed longer than the thickness of the holder body 110.

The rotation locking parts 190 are positioned on side portions of each of the locking parts 180.

In addition, the thickness of each of the rotation locking parts 190 gradually becomes thicker from one side to the other side.

Therefore, when the cover 400 is rotated on an inner circumference of the holder body 110, one end of each of the rotation locking parts 190 comes into contact with the outer circumference of the cover 400, the cover 400 is rotated to the fastening position, and thus the outer circumference of the cover 400 is gradually pressed into contact with a thicker side thereof.

Therefore, the thickness of the rotation locking parts 190 may be gradually increased in a fastening direction, and when the cover 400 rotates, a rotational force may be gradually reduced. Further, a fastening sound is generated at this fastening position so that an operator can recognize the fastening.

Below, the cover according to the present invention will be described.

Figure 12:
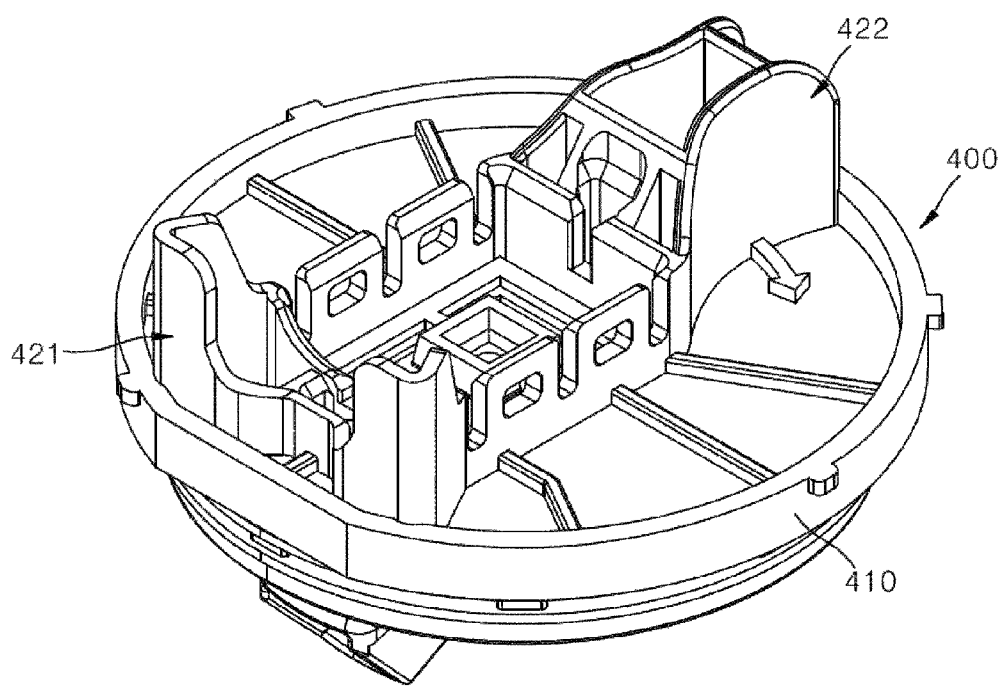
FIG. 12 is a perspective view illustrating a bottom surface of the cover according to the present invention.

FIG. 12 is a perspective view illustrating a bottom surface of the cover according to the present invention.

Referring to FIG. 12, the cover 400 according to the present invention has a cover body 410 formed in a disc shape.

A pair of first support portions 421 protruding upward are formed at one end of one surface of the cover body 410. The pair of first support portions 421 protrude upward. The pair of first support portions 421 are formed to face each other and have an L-shaped cross section.

A second support portions 422 protruding upward is formed at the other end of one surface of the cover body 410.

Here, the connector housing 300 is disposed in a space between the pair of first support portions 421 and the second support portion 422.

Both sides of one end of the connector housing 300 are supported by the pair of first support portions 421, and the other end of the connector housing 300 is supported by the second support portion 422.

Further, the pair of first support portions 421 and the second support portion 422 protrude upward along the connector housing 300.

Accordingly, the pair of first support portions 421 and the second support portion 422 according to the present invention may serve as a hand tool that may be held by the operator when the cover 100 is installed in the panel 10.

Further, corners of the pair of first support portions 421 and the second support portion 422 are formed in a rounded shape, so that the operator can be protected and damage caused by a collision with an object can be prevented.

Further, the pair of first support portions 421 and the second support portion 422 may perform guiding when the connector housing 300 is assembled.

Further, when the cover 400 is installed in the panel 10, the pair of first support portions 421 and the second support portion 422 can prevent the connector housing 300 from being caught by the panel 10.

Figure 13:
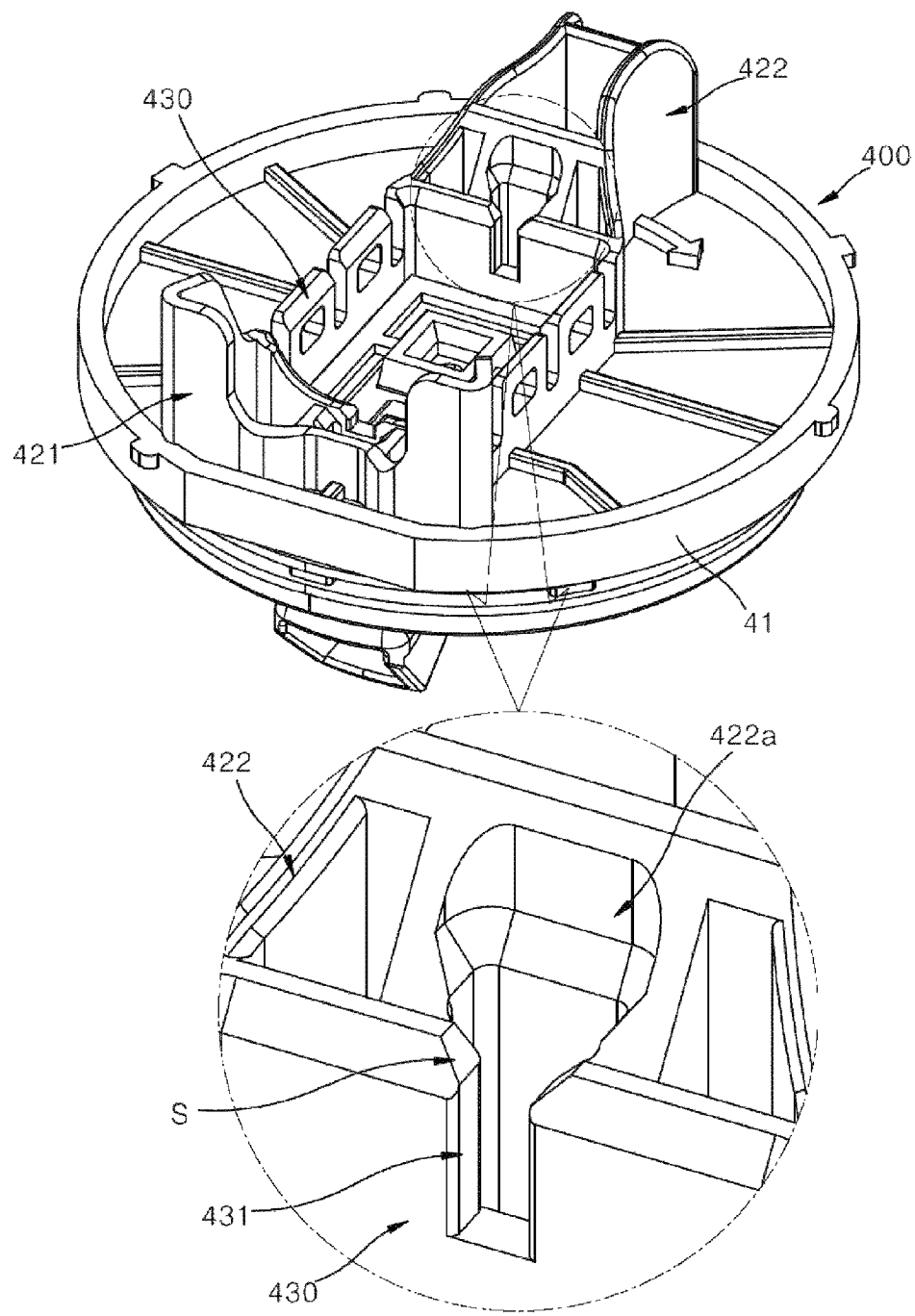
FIG. 13 are perspective views illustrating the bottom surface of the cover according to the present invention.
Figure 14:
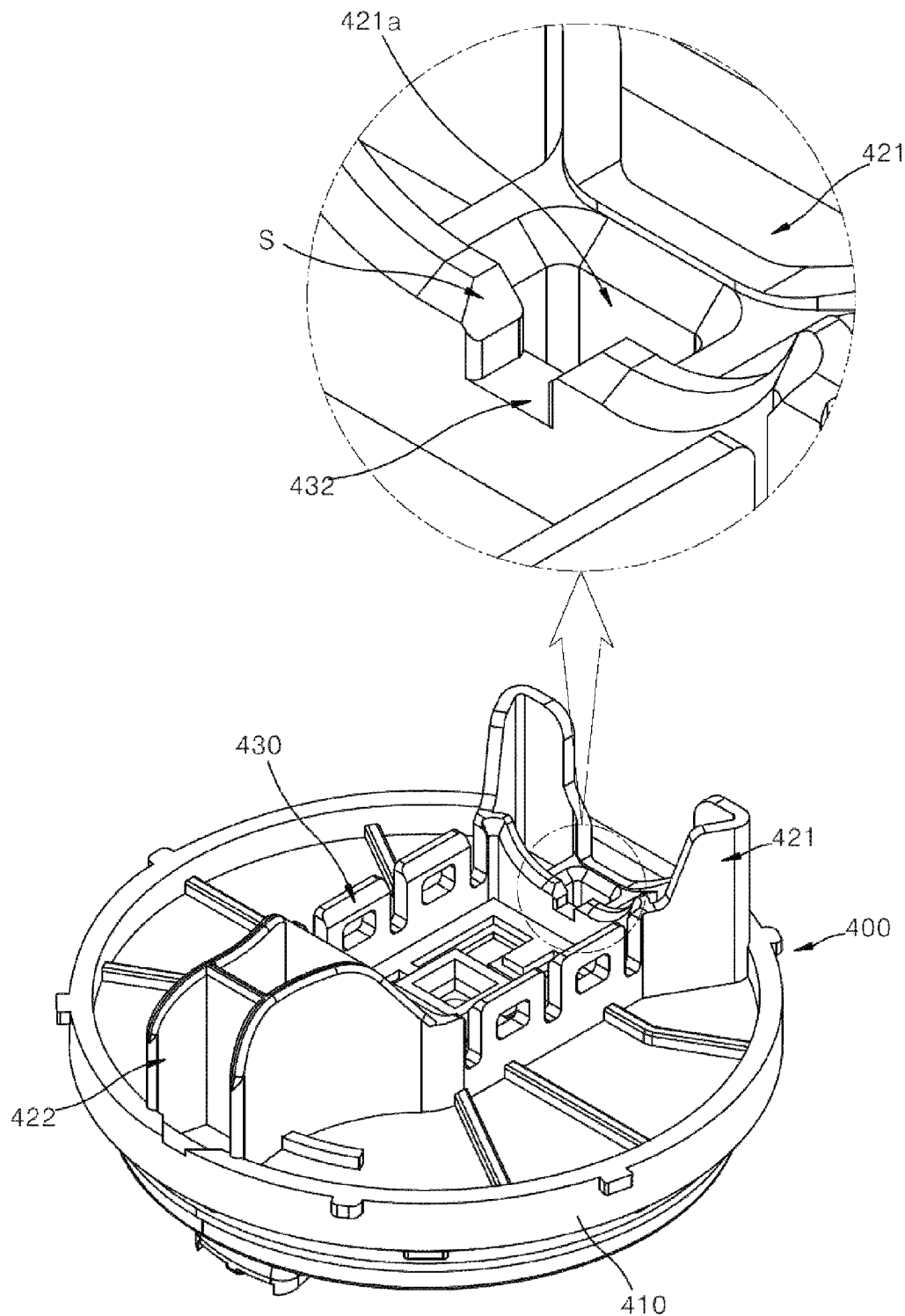
FIG. 14 are views illustrating separation prevention grooves according to the present invention.

FIG. 13 are perspective views illustrating the bottom surface of the cover according to the present invention, and FIG. 14 are views illustrating separation prevention grooves according to the present invention.

Referring to FIGS. 13 and 14, a seating part 430 in which an inner space is formed and a corner is formed in a wall body is formed between the pair of first support portions 421 and the second support portion 422 according to the present invention.

The connector housing 300 is seated on the inner space of the seating part 430.

Here, cutout grooves 431 and 432 are formed at one end and the other end of the seating part 430.

Further, a second insertion groove 422*a* is formed in the second support portion 422, and the second insertion groove 422*a* is connected to the cutout groove 431 formed at the other end of the seating part 430.

Further, a first insertion groove 421*a* is formed between the pair of first support portions 421, and the first insertion groove 421*a* is connected to the cutout groove 432 formed at the one end of the seating part.

Here, the first and second insertion grooves 421*a* and 422*a* are coupled as fitting structures formed at both ends of the connector housing 300 are fitted in the first and second insertion grooves 421*a* and 422*a*. Therefore, the first and second insertion grooves 421*a* and 422*a* can guide the coupling of the connector housing 300 and prevent separation of the connector housing 300.

Further, inclined surfaces S inclined inward are formed in entrances of the first and second insertion grooves 421*a* and 422*a*. The inclined surfaces S serve to guide the fitting structures of the connector housing 300 such that the fitting structures are inserted.

Figure 15:
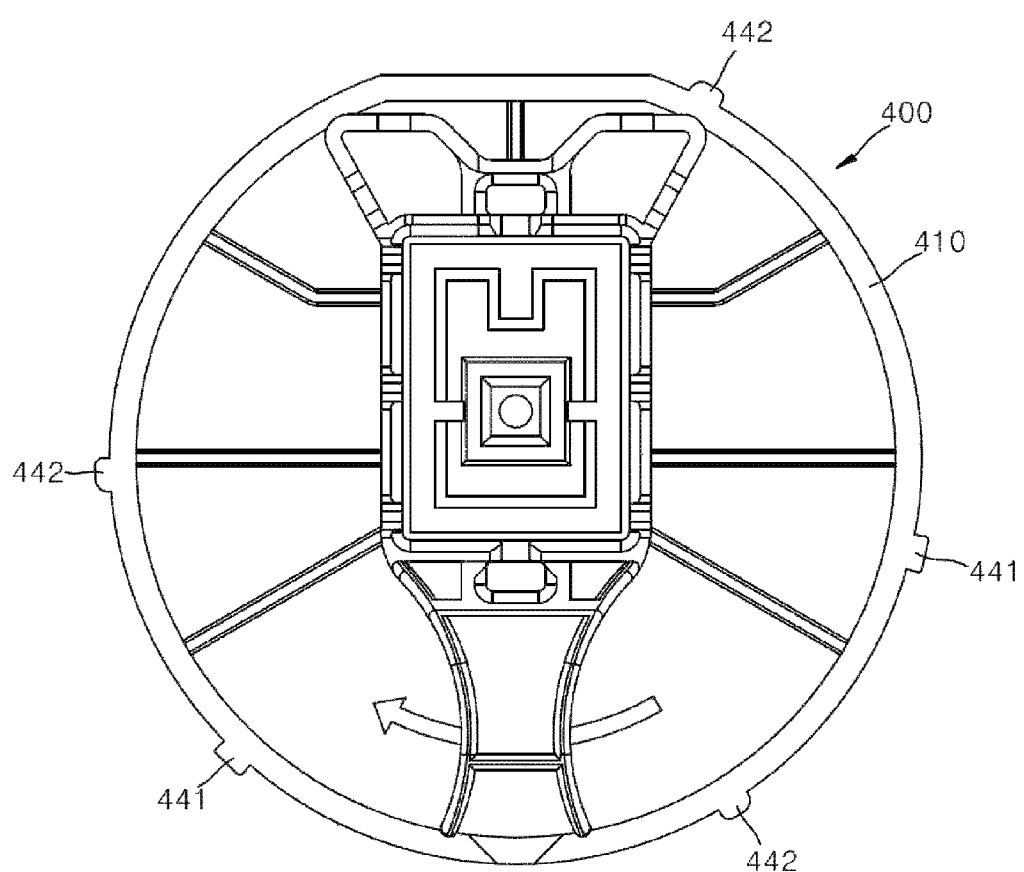
FIG. 15 is a bottom view illustrating the cover according to the present invention.

FIG. 15 is a bottom view illustrating the cover according to the present invention.

Referring to FIG. 15, reverse rotation prevention protrusions 441 protruding outward are formed at intervals at a plurality of positions of an outer circumference of the cover body 410 according to the present invention. The reverse rotation prevention protrusions 441 are formed in a quadrangular shape.

Further, rotation guide protrusions 442 protrude from a respective plurality of positions of the cover body 410. The rotation guide protrusions 422 may be formed in a quadrangular shape, and corners thereof have a predetermined curvature.

Further, the rotation guide protrusion 442 is formed to correspond to the number of rotation locking parts 190 formed on the outer wall of the holder body 110.

Accordingly, when the holder body 110 and the cover body 410 are coupled and the cover body 410 rotates in an arrow direction, the rotation guide protrusions 442 move along a surface of which the thickness increases from one end to the other end of the rotation locking parts 190, and the rotation guide protrusions 442 pass through the rotation locking parts 190 at distal ends. In this case, a fastening sound may be generated while the rotation guide protrusions 442 are separated from the distal ends of the rotation locking parts 190.

Further, the reverse rotation prevention protrusions 441 are caught by the other ends of the rotation locking parts 190 having a relatively large thickness, so that the cover body 410 according to the present invention can be prevented from being reversely rotated in a direction opposite to the arrow direction.

Figure 16:
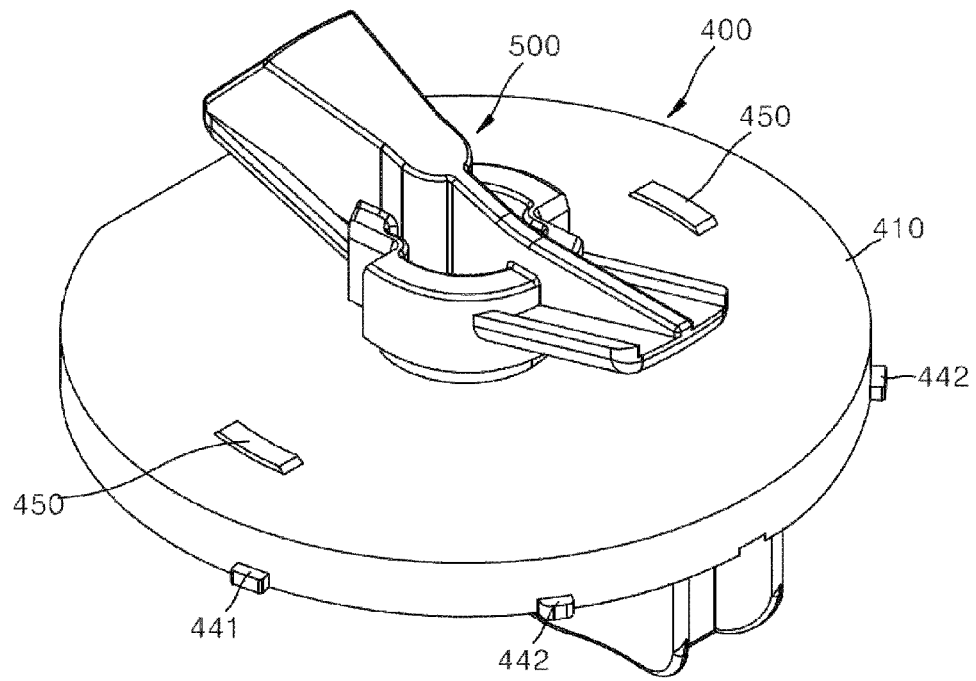
FIG. 16 is perspective view illustrating the cover according to the present invention.

FIG. 16 is perspective view illustrating the cover according to the present invention.

Referring to FIG. 16, auxiliary protrusion parts 450 are formed at two positions on an upper surface of the cover body 410 according to the present invention. The auxiliary protrusion parts 450 may be formed as a pair or more of auxiliary protrusion parts 450.

The auxiliary protrusion parts 450 may have substantially the same height as the protrusion parts 140 formed in the holder body 110.

The seals 130 arranged on both sides of the holder body 110 in the present invention form sealing due to contact with a counterpart.

In this case, while the cover body 410 rotates, the cover body 400 comes into physical contact with a section in which the auxiliary protrusion parts 450 are formed and thus rotates while lifted by the height of the auxiliary protrusion parts 450. Accordingly, when the cover body 410 rotates, the cover body 410 may rotate relative to the holder body 110 while protecting the seal 130.

Further, when the holder body 110 passes through a section of the protrusion parts 140 and is rotated to a fastening position, one surface of the holder body 110 that is a counterpart is separated from the auxiliary protrusion parts 450 and returns to its original position. In this case, the seal 130 may be in elastic contact with the upper surface of the cover body 410 to achieve smooth sealing at a position at which the rotation is completed, and thus fastening sense can be improved, and a rotational force can be reduced during the rotation.

Here, an upper surface of each of the auxiliary protrusion parts 450 may also be formed in a convex curvature.

Figure 17:
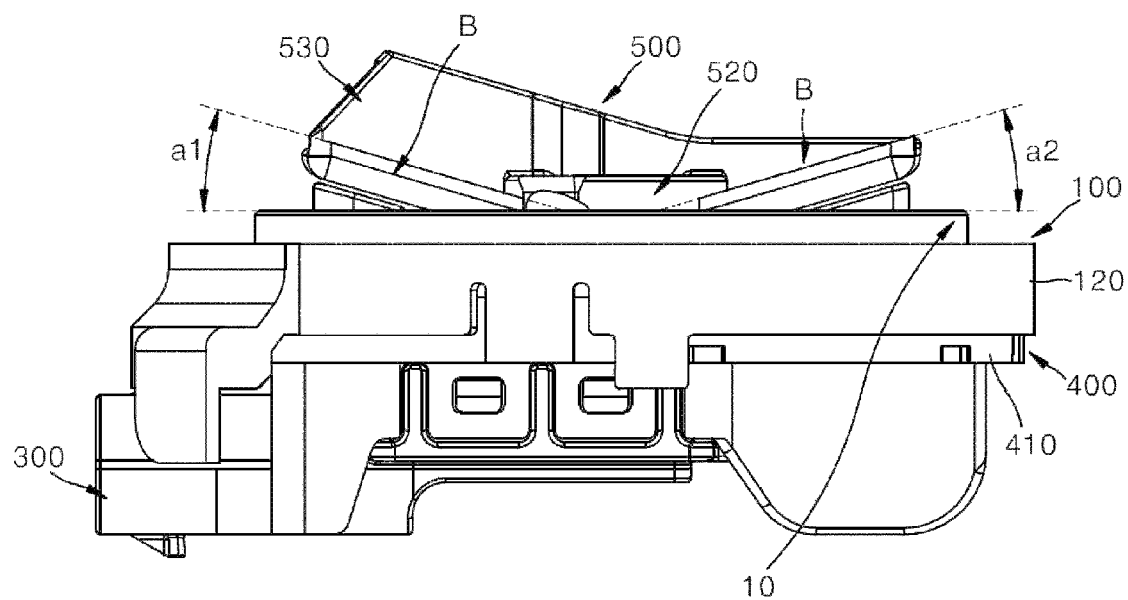
FIG. 17 is a side view illustrating an arrangement state of the sensor unit formed in the cover according to the present invention.

FIG. 17 is a side view illustrating an arrangement state of the sensor unit formed in the cover according to the present invention.

Referring to FIG. 17, the sensor unit 500 is formed at a center of an upper end of the cover body 410 according to the present invention.

The sensor unit 500 has a connection body 520 formed at a center of the cover body 410, a pressure inlet body 530 in which a pressure inlet 531 extending to one side of the connection body 520 is formed, and an extension body 540 extending to the other side of the connection body 520.

Here, blades B are formed on both side surfaces of the pressure inlet body 530 and the extension body 540.

Each of the blades B forms a predetermined inclination rising along an upper side from the center of the cover body 410. The inclinations of the blades B are identical to each other (a1=a2). Therefore, the cover body 410 may advantageously be installed in panels having different thicknesses according to an inclination angle.

Further, the blades B according to the present invention are formed to protrude at regular intervals from the assembly guides formed on the holder body 110. Therefore, when the cover body 410 is installed in the panel 10, the blades B of the sensor unit 500 may be arranged to pass through the panel 10 and to be caught by an upper surface of the panel 10.

Figure 18:
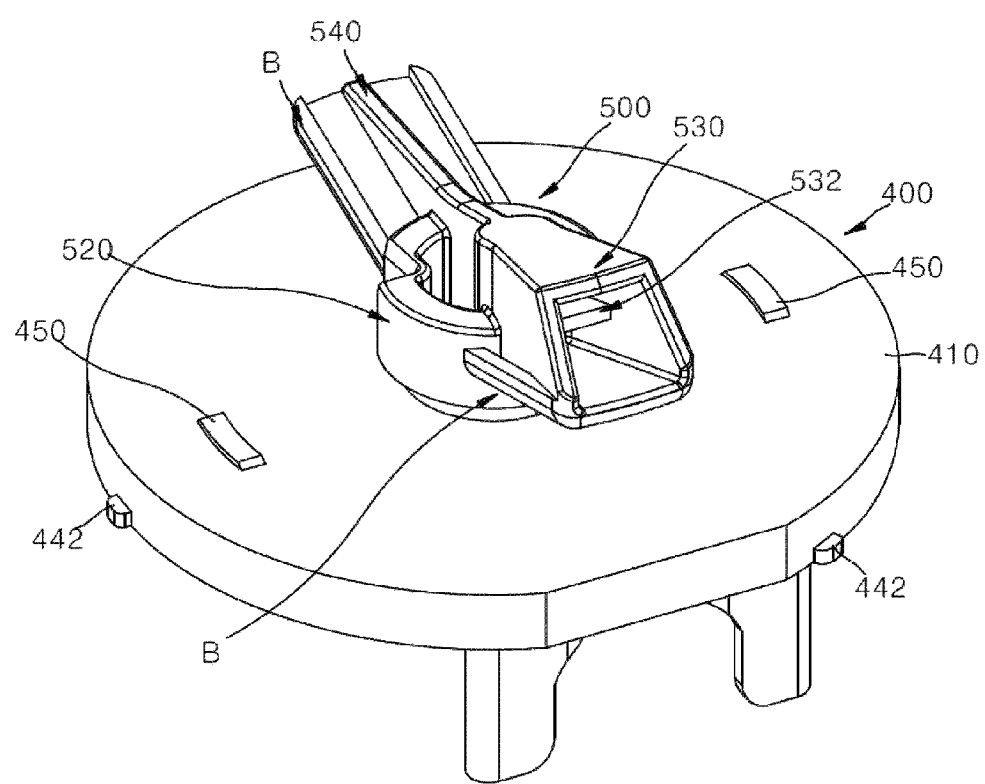
FIG. 18 is perspective view illustrating the cover according to the present invention.
Figure 19:
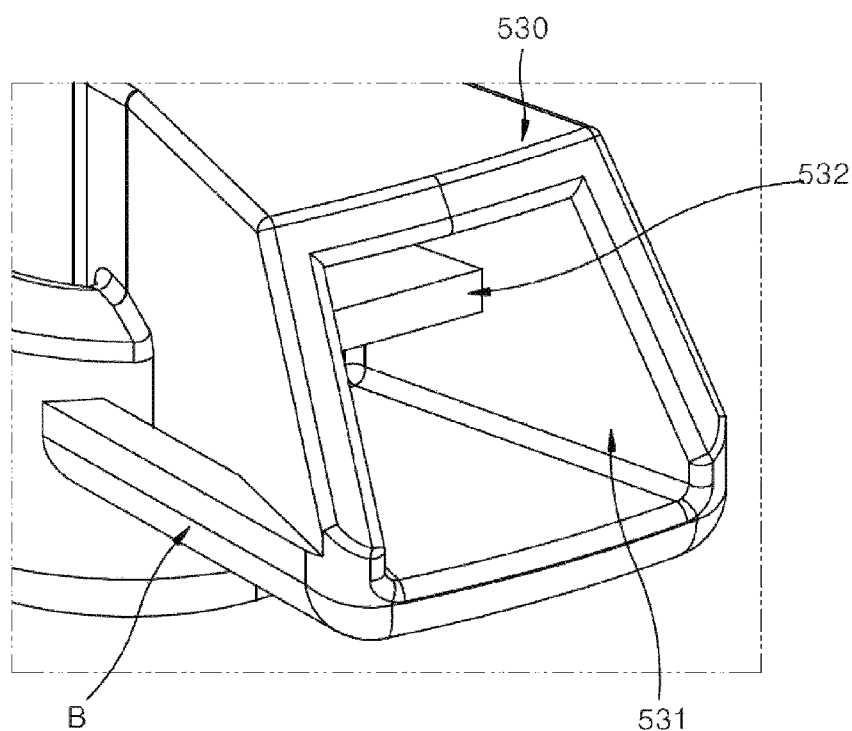
FIG. 19 is a perspective view illustrating a pressure inlet of FIG. 18.

FIG. 18 is perspective view illustrating the cover according to the present invention, and FIG. 19 is a perspective view illustrating a pressure inlet of FIG. 18.

Referring to FIGS. 18 and 19, in the pressure inlet body 530 according to the present invention, the pressure inlet 531 is formed.

A layered partition member 532 is formed inside the pressure inlet 531. The partition member 532 is positioned inside an input end of the pressure inlet 531.

Therefore, foreign substances may be filtered out by the partition member 532 formed in the pressure inlet 531.

According to the configuration and operation described above, in the present invention, the holder and the cover are prevented from being separated from each other, and when the cover 400 passes through a section of the protrusion parts 140 and rotates to a set fastening position, one surface of the cover 400 is separated from the protrusion parts 140 and returns to its original position. In this case, the seal 130 is in elastic contact with the cover 400, and thus smooth sealing can be achieved at a position at which the rotation is completed.

Further, in the present invention, the connector housing 300 is covered through the prevention plate 152 before fastening between the holder 100 and the cover 400 is completed, and thus fastening of the connector housing 300 can be prevented from the outside.

In the present invention, a holder and a cover are prevented from being separated from each other, and when the cover (400) passes through a section of the protrusion parts (140) and rotates to a set fastening position, one surface of the cover (400) is separated from the protrusion parts (140) and returns to its original position. In this case, the seal (130) is in elastic contact with the cover (400), and thus smooth sealing can be achieved at a position at which the rotation is completed.

Further, in the present invention, the connector housing (300) is covered through the prevention plate (152) before fastening between the holder (100) and the cover (400) is completed, and thus fastening of the connector housing (300) can be prevented from the outside.

Detailed descriptions of the present invention have been described above, but it is obvious that various modifications may be made without departing from the scope of the present invention.

Therefore, the scope of the present invention is not limited to the described embodiments and should be defined by equivalents of the appended claims as well as the scope of the appended claims.

That is, it should be understood that the above-described embodiments are illustrative in all aspects and not restrictive, the scope of the present invention is indicated by the appended claims described below rather than the detailed description, and it should be construed that the meaning and scope of the appended claims and all changes and modifications derived from equivalent concepts thereof are included in the scope of the present invention.

What is claimed is:

1. A fixing device for installing a pressure-type airbag sensor, the fixing device comprising:
   a holder having a disc shape;
   a cover coupled to the holder and having a sensor unit disposed at an upper end thereof;
   a connector housing disposed at a lower end of the cover, wherein
   the cover includes a cover body having a disc shape,
   reverse rotation prevention protrusions protruding outward are formed at intervals at a plurality of positions on an outer circumference of the cover body,
   the reverse rotation prevention protrusions are formed in a quadrangular shape,
   rotation guide protrusions protrude from a respective plurality of positions of the cover body, the rotation guide protrusions are formed in a quadrangular shape, and corners thereof are formed in a predetermined curvature,
   the rotation guide protrusions are formed to correspond to a number of rotation locking parts formed on an outer wall of the holder,
   when the cover body rotates in one direction, the rotation guide protrusions move along surfaces of the rotation locking parts, the rotation guide protrusions pass through the rotation locking parts at distal ends of the rotation locking parts, and a fastening sound is generated while the rotation guide protrusions are separated from the distal ends of the rotation locking parts,
   the surfaces of the rotation locking parts extend from a first end of a corresponding rotation locking part to a second end of the corresponding rotation locking part, and a thickness of each of the rotation locking parts increases from the first end to the second end of each corresponding rotation locking part, and
   the reverse rotation prevention protrusions are caught by the second ends of the rotation locking parts having a relatively large thickness compared to the first ends of the rotation locking parts.

2. The fixing device of claim 1, wherein a pair of first support portions protruding upward are formed at one end of one surface of the cover body,
   the pair of first support portions protrude upward,
   the pair of first support portions are formed to face each other and have an L-shaped cross section,
   a second support portion protruding upward is formed at the other end of the one surface of the cover body, and
   the connector housing is disposed in a space between the pair of first support portions and the second support portion.

3. The fixing device of claim 1, wherein a sensor unit is formed at a center of an upper end of the cover body,
   the sensor unit includes:
   a connection body formed at a central portion of the cover body;
   a pressure inlet body having a pressure inlet formed therein and extending to one side of the connection body; and
   an extension body extending to the other side of the connection body.

4. The fixing device of claim 3, wherein the pressure inlet is formed in the pressure inlet body,
   a layered partition member is formed inside the pressure inlet, and
   the partition member is positioned inside an input end of the pressure inlet.

5. The fixing device of claim 1, wherein auxiliary protrusion parts are formed at two positions of an upper surface of the cover body, respectively.

* * * * *